US012573977B2

(12) United States Patent
Ye et al.

(10) Patent No.: US 12,573,977 B2
(45) Date of Patent: Mar. 10, 2026

(54) PHOTOVOLTAIC PANEL FASTENER AND PHOTOVOLTAIC PANEL MODULE MOUNTING DEVICE

(71) Applicant: A. RAYMOND ET CIE, Grenoble (FR)

(72) Inventors: Rian Ye, Zhejiang (CN); Antoine Le Gall, Fontaine (FR)

(73) Assignee: A. RAYMOND ET CIE, Grenoble (FR)

( * ) Notice: Subject to any disclaimer, the term of this patent is extended or adjusted under 35 U.S.C. 154(b) by 114 days.

(21) Appl. No.: 18/549,248

(22) PCT Filed: Mar. 8, 2022

(86) PCT No.: PCT/FR2022/050418
§ 371 (c)(1),
(2) Date: Sep. 6, 2023

(87) PCT Pub. No.: WO2022/189751
PCT Pub. Date: Sep. 15, 2022

(65) Prior Publication Data
US 2024/0146231 A1 May 2, 2024

(30) Foreign Application Priority Data

Mar. 8, 2021 (CN) .......................... 202110251505.5
Mar. 25, 2021 (FR) ....................................... 2103004

(51) Int. Cl.
*H02S 20/00* (2014.01)
*F24S 25/60* (2018.01)
(Continued)

(52) U.S. Cl.
CPC .............. *H02S 20/00* (2013.01); *H02S 30/00* (2013.01); *F24S 2025/6003* (2018.05); *F24S 2025/6006* (2018.05); *F24S 25/636* (2018.05)

(58) Field of Classification Search
CPC ........ H02S 20/00; H02S 30/00; F24S 25/636; F24S 2025/6003; F24S 2025/6006; Y02E 10/47
See application file for complete search history.

(56) References Cited

U.S. PATENT DOCUMENTS 10,749,459 B1 * 8/2020 Liu ....................... F16B 5/0685
2008/0038049 A1 2/2008 Kullen et al.
(Continued)

FOREIGN PATENT DOCUMENTS

DE 202014102470 8/2014
EP 2149648 2/2010
(Continued)

OTHER PUBLICATIONS

International Search Report for application No. PCT/FR2022/050418 dated Jun. 15, 2022.

*Primary Examiner* — Jessie T Fonseca
(74) *Attorney, Agent, or Firm* — Perman & Green, LLP

(57) ABSTRACT

A photovoltaic panel fastener and a device for mounting a panel module. The panel fastener, capable of cooperating with threaded fasteners to attach an assembly frame of the panel to a support structure, includes: a main body; a threaded connector extending perpendicularly to the body and having a passage for receiving the threaded fastener, and the inner wall of the passage of which is provided with an inner thread; a pair of clamping elements extending from the end surface of the body and being disposed along the first direction and symmetrical with respect to the central axis of the threaded connector; and a pair of support elements being disposed along the second direction and symmetrical with respect to the central axis. Each support element is connected to a clamping element and extends beyond the free end of the clamping element.

11 Claims, 9 Drawing Sheets

(51) Int. Cl.
*F24S 25/636* (2018.01)
*H02S 30/00* (2014.01)

(56) References Cited

U.S. PATENT DOCUMENTS

| | | | | |
|---|---|---|---|---|
| 2010/0294340 A1* | 11/2010 | Cunningham | .......... | F24S 80/40 |
| | | | | 136/251 |
| 2011/0001030 A1* | 1/2011 | Hochreiter | .......... | F24S 25/636 |
| | | | | 248/316.1 |
| 2012/0167364 A1* | 7/2012 | Koch | .......... | F24S 25/30 |
| | | | | 29/281.1 |
| 2013/0014809 A1 | 1/2013 | Sagayama et al. | | |
| 2013/0064625 A1* | 3/2013 | Spitz | .......... | F16B 37/0842 |
| | | | | 411/516 |
| 2013/0320166 A1* | 12/2013 | Kemple | .......... | F24S 25/30 |
| | | | | 248/220.22 |
| 2014/0048498 A1* | 2/2014 | Kuan | .......... | F24S 25/60 |
| | | | | 211/41.1 |
| 2014/0137489 A1* | 5/2014 | Habdank | .......... | F24S 25/636 |
| | | | | 52/173.3 |
| 2014/0290717 A1* | 10/2014 | Chiu | .......... | F24S 25/20 |
| | | | | 248/316.4 |
| 2015/0107168 A1* | 4/2015 | Kobayashi | .......... | H02S 20/23 |
| | | | | 52/173.3 |
| 2015/0180404 A1 | 6/2015 | Braunstein et al. | | |
| 2015/0249423 A1* | 9/2015 | Braunstein | .......... | F16B 5/0685 |
| | | | | 52/173.3 |
| 2016/0069592 A1* | 3/2016 | Giraudo | .......... | F24S 25/00 |
| | | | | 248/220.21 |
| 2018/0316307 A1* | 11/2018 | Martin | .......... | F16B 2/065 |
| 2019/0178274 A1 | 6/2019 | Katz | | |
| 2019/0372507 A1* | 12/2019 | Kobayashi | .......... | F16B 5/0628 |
| 2020/0049378 A1* | 2/2020 | Markiewicz | .......... | F24S 25/636 |
| 2020/0309184 A1 | 10/2020 | Schuit et al. | | |

FOREIGN PATENT DOCUMENTS

| | | | |
|---|---|---|---|
| JP | 54150322 | 10/1979 | |
| JP | 58147261 | 10/1983 | |

* cited by examiner

PHOTOVOLTAIC PANEL FASTENER AND PHOTOVOLTAIC PANEL MODULE MOUNTING DEVICE

CROSS REFERENCE TO RELATED APPLICATIONS

This application is a National Stage of International Application No. PCT/FR2022/050418, having an International Filing Date of 8 Mar. 2022, which designated the United States of America, and which International Application was published under PCT Article 21(2) as WO Publication No. 2022/189751 A1, which claims priority from and the benefit of Chinese Patent Application 202110251505.5 filed on 8 Mar. 2021 and French Patent Application No. 2103004 filed on 25 Mar. 2021, the disclosures of which are incorporated herein by reference in their entireties.

BACKGROUND

Field

The present disclosure generally relates to a fastener. More particularly, it relates to a photovoltaic panel fastener for fastening a photovoltaic panel module to a support structure, and a device for mounting a photovoltaic panel module including such fasteners.

Brief Description of Related Developments

With respect to conventional energy sources, solar energy is practical to use and not very costly. Photovoltaic solar panels are used to directly convert solar energy into electric energy in order to power electric equipment or provide electric energy to the power grid. Generally, the assembly frame for maintaining and fastening the solar panel is installed on a support structure, a guide rail or a wall plate of the building, or installed on the ground by threaded fasteners and supports.

As shown in FIG. 1, the assembly frame 10 of the photovoltaic solar panel is mainly fastened to the support structure 20 of the photovoltaic panel by bolts 30 and nuts 40. The nut 40 is generally placed in the cavity of the assembly frame 10, and the bolt 30 is inserted into the support structure 20 and adapted to the nut 40 placed in the assembly frame 10 to attach the assembly frame 10 to the support structure 20. Given that the space for housing the nut 40 in the assembly frame 10 is limited, it is not favourable to the precise positioning of the nut 40 during the mounting process, which makes quickly finding a position of alignment of the bolt 30 and of the nut 40 difficult. Moreover, the nut 40 is easy to rotate in the assembly frame 10 during the mounting process, and the clamping force cannot be controlled, which makes the entirety of the mounting process long and tedious, and the stability of the assembly cannot be guaranteed.

SUMMARY

The object of the disclosure is to propose a photovoltaic panel fastener with a simple structure and practical operation, in order to effectively reduce the cost of labour and of production.

For this purpose, according to one aspect of the present disclosure, a photovoltaic panel fastener is provided. It is configured to cooperate with threaded fasteners to fasten the assembly frame of the photovoltaic panel to a support structure. The photovoltaic panel fastener comprises:

a main body, the main body being substantially parallel to the mounting plane of the support structure;

a threaded connector, the threaded connector extending perpendicularly to the main body and having a passage to receive the threaded fastener, and the inner wall of the passage of which is provided with an inner thread to cooperate with the outer thread of the threaded fastener;

a pair of clamping elements extending respectively from the end surface of the main body and which are disposed along the first direction and symmetrical with respect to the central axis of the threaded connector, so as to be suitable for clamping the assembly frame; and a pair of support elements, the pair of support elements being disposed along the second direction and symmetrical with respect to the central axis of the threaded connector, wherein each support element is respectively connected to a clamping element and extending beyond the free end of the clamping element to bear against the mounting plane of the support structure, and the second direction is perpendicular to the first direction.

Advantageously, the threaded connector which adapts to the threaded fastener is disposed directly on the photovoltaic panel fastener. It suffices to screw the threaded fastener into the threaded connector to carry out a fast fastening, without having to handle the threaded connector in the assembly frame, this facilitating the installation and the disassembly and thus reducing the cost of labour with less time necessary. Moreover, the support elements and the clamping elements are disposed symmetrically in two directions perpendicular to one another, which makes the structure of the photovoltaic panel fasteners more compact and improves the overall resistance.

The disclosure can further comprise one or more of the following features.

In some aspects, the threaded connector and the pair of clamping elements are disposed on the same side of the main body, and the pair of support elements are spaced apart so that they do not interfere with the outer circumference of the threaded connector; or the threaded connector and the pair of clamping elements are respectively arranged on both sides of the main body, and the spacing between the pair of support elements is less than the outer diameter of the corresponding threaded fastener.

In some aspects, the support element is configured to be substantially in the shape of a U and comprises a first support part extending towards the main body, a second support part for bearing against the mounting plane of the support structure, and a support link part between the first support part and the second support part, wherein the second support part is connected with the clamping element via a bridge in the shape of an arc.

In some aspects, the bridge in the shape of an arc is folded towards the inside from the free end of the clamping element to extend up to the second support part.

The structure of the support element of the disclosure allows to increase the zone of contact between the support element and the mounting plane of the support structure, thus reinforcing the stability of the support. Moreover, the support elements and the clamping elements are connected by bridges in the shape of an arc, this allowing to have a desired fastening resistance.

In some aspects, the support element is provided with a reinforcing rib extending from the first support part to the second support part.

In some aspects, the clamping element is provided with a notch to reduce the rigidity of the clamping element.

In some aspects, the photovoltaic panel fastener has a first state, called preassembly state, and a second state, called fastening state: in the first state, the support element and the main body are separated by a first space, and in the second state, the support element bears against the main body under the action of a clamping force.

The first space first allows a visual verification in various states. The main body allows to provide a support when the support element bears against the main, which further reinforces the overall resistance of the photovoltaic panel fastener.

In some aspects, the fastening force is applied by screwing the threaded fastener into the threaded connector along the passage.

According to another aspect of the present disclosure, a device for mounting a photovoltaic panel module is provided. The mounting device comprises an assembly frame for the installation of photovoltaic panels, a support structure and at least one photovoltaic panel fastener according to the present disclosure. In this mounting device, the assembly frame further comprises a frame body and a photovoltaic panel clamping slot provided on the top of the frame body. The frame body comprises a cavity provided with an opening for receiving the photovoltaic panel fastener. A pair of clamping elements of the photovoltaic panel fastener are configured to be stopped against an inner stop surface in the cavity when they are inserted into the cavity via the slot. When the photovoltaic panel fastener is in the preassembly state, there is a second space between the clamping element and the inner stop surface. When the photovoltaic panel fastener is in the fastening state, the clamping elements bear against the inner stop surface under the action of the clamping force.

In some aspects, the support structure is provided with a mounting hole corresponding to the slot, so that the threaded fastener can be coupled with the threaded connector while passing through the mounting hole and the slot, hence the fastening force is applied by screwing of the threaded fastener of the support structure into the threaded connector of the photovoltaic panel fastener.

In some aspects, the width of the support element of the photovoltaic panel fastener is configured to be less than or equal to that of the slot.

The photovoltaic panel fasteners proposed have a simple and compact structure, requiring a reduced space. Advantageously, the panel fasteners are easy to adjust and mount/disassemble on the support structure and the assembly frame allowing to save the mounting costs and improve the efficiency of the work. The fastener of the photovoltaic panel in the device for mounting the photovoltaic panel module allows to easily obtain a stable and reliable installation, which is adapted to numerous circumstances.

BRIEF DESCRIPTION OF THE DRAWINGS

The other features and advantages of the present disclosure will be better understood via the following optional implementations described in detail in relation to the appended drawings. The same signs in the appended drawings identify the same components or similar components, in which:

FIG. 2b is an orthographic view of the assembly frame shown in FIG. 2a;

FIG. 3b is an orthographic view of the support structure shown in FIG. 3a;

FIG. 5b is a cross-sectional view in the state shown in FIG. 5a;

FIG. 5c is another cross-sectional view in the state shown in FIG. 5a;

FIG. 6b is a cross-sectional view of the state shown in FIG. 6a;

FIG. 7b is a cross-sectional view in the state shown in FIG. 7a.

DETAILED DESCRIPTION

Figure 1:
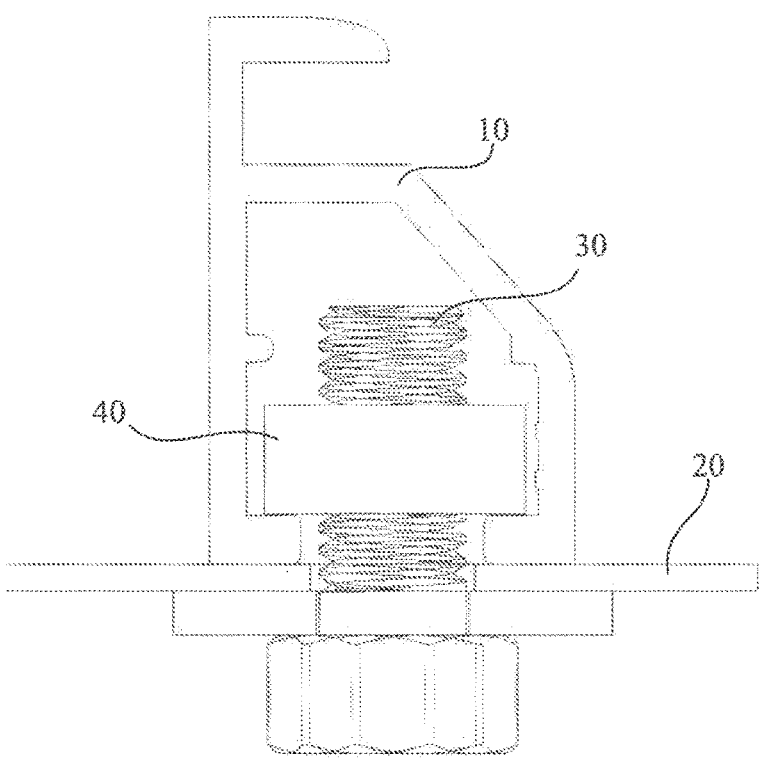
FIG. 1 illustrates a device for mounting a photovoltaic panel module known from the prior art.

The aspects are described in detail below. It must be understood that the specific aspects described are simply illustrative of specific implementations of the present disclosure, and are in no way limiting. The structural position of each component, such as above, below, at the top and at the bottom, is not absolute, but relative. When the various parts are disposed as indicated in the drawing, these expressions of direction are appropriate, but when the position of each part in the drawing changes, these expressions of direction also change accordingly.

The photovoltaic panel fastener according to the present disclosure is used to attach the assembly frame of the photovoltaic panel and the support structure. In the aspects described below, an assembly frame and a support structure are illustrated as an example, but it must be understood that the photovoltaic panel fastener of the present disclosure is also applicable to assembly frames and support structures with other similar structures.

Figure 2A:
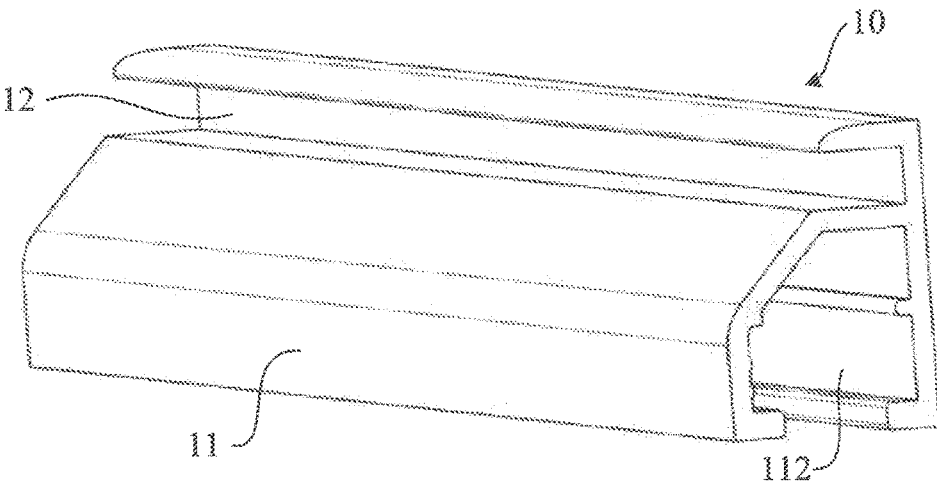
FIG. 2a is a perspective view of a frame for mounting photovoltaic panels according to an aspect of the present disclosure.
Figure 2B:
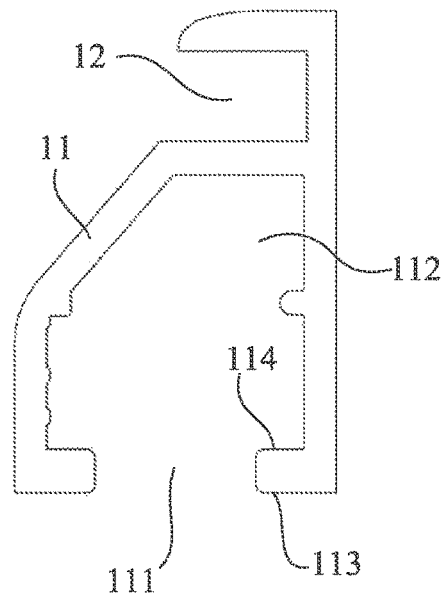

In reference first of all to FIGS. 2a and 2b, an assembly frame 10 is visible. The assembly frame 10 has, for example, an elongated structure, and comprises a frame body 11 and a photovoltaic panel clamping slot 12 provided on the upper part of the frame body 11. The frame body 11 comprises a cavity 112 provided with an opening 111 for receiving photovoltaic panel fasteners, the opening 111 extending over the length of the assembly frame 10. The side of the frame body 11 on which the opening 111 is provided comprises an outer contact surface 113 configured to come in contact with the support structure, and an inner stop surface 114 located in the cavity 112, the inner stop surface 114 being used to cooperate with the corresponding parts of the photovoltaic panel fasteners.

Figure 3A:
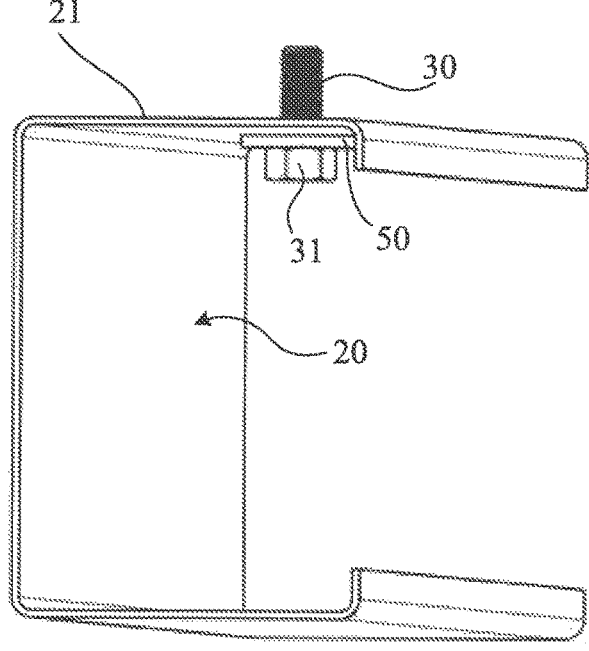
FIG. 3a is a perspective view of a support structure according to an aspect of the present disclosure, showing an assembled threaded fastener.
Figure 3B:
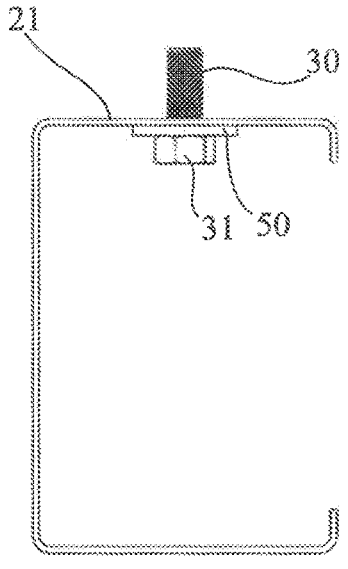
Figure 5A:
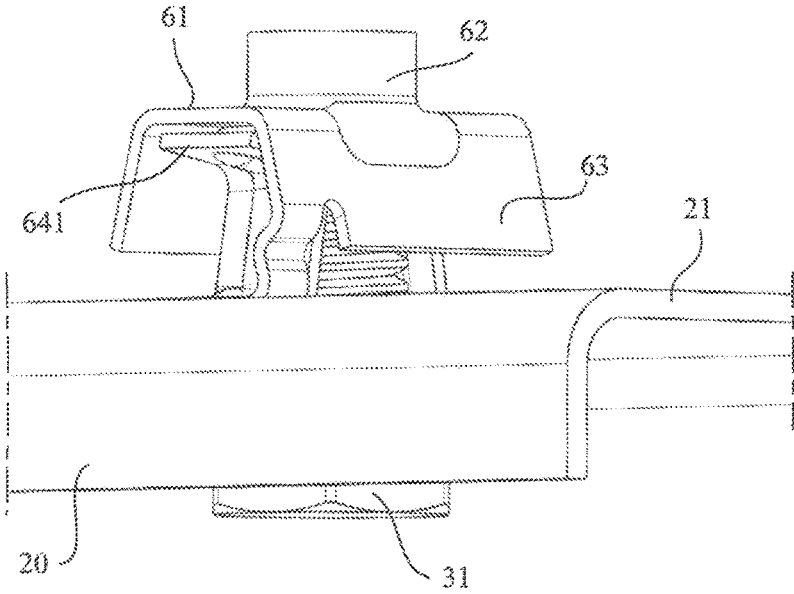
FIG. 5a is a perspective view of the photovoltaic panel fastener installed on the support structure in the first state.
Figure 5B:
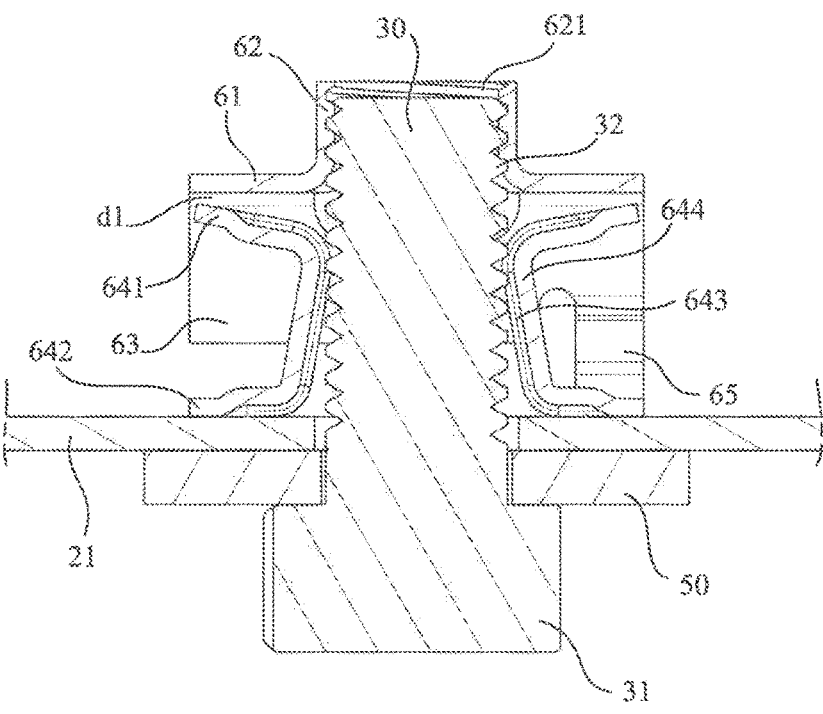
Figure 5C:
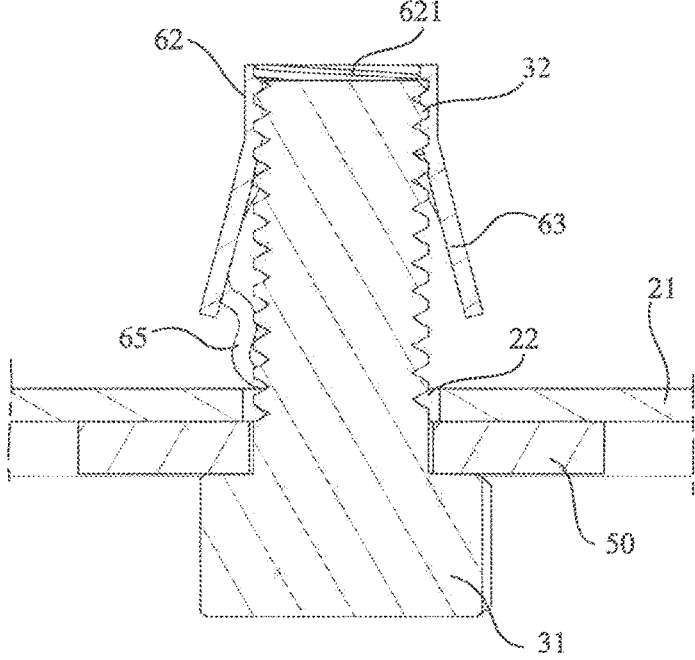

FIGS. 3a and 3b show a support structure 20. The support structure 20 is, for example, in the shape of a C, comprising a mounting surface 21 that can come in contact with the outer contact surface 113 of the assembly frame 10. The mounting surface 21 includes a mounting hole (as illustrated in FIG. 5c) which corresponds to the opening 111 for receiving threaded fasteners. Optionally, the threaded fastener is a bolt 30 with a nut 31 as shown in the drawing. In some aspects, a washer 50 is provided between the nut 31 of the bolt 30 and the support structure 20. The dowel section of the bolt 30 can be connected to the photovoltaic panel fastener by passing through the mounting hole 22 and the opening 111 of the assembly frame 10, so as to fasten the assembly frame 10 to the support structure 20.

According to the present disclosure, the threaded connector is integrated onto the fastener of the photovoltaic panel, and the engagement between the bolt and the threaded fastener can be obtained by actuating the bolt on the support structure. In this way, the narrow operating space on the assembly frame is converted into a larger space on the support structure, which is practical for the assembly and the disassembly by the operator. Moreover, in comparison to existing structures, the photovoltaic panel fastener of the present disclosure has an increased overall resistance, so that the assembled photovoltaic panel module is more stable and reliable, and can adapt to various circumstances.

Figure 4A:
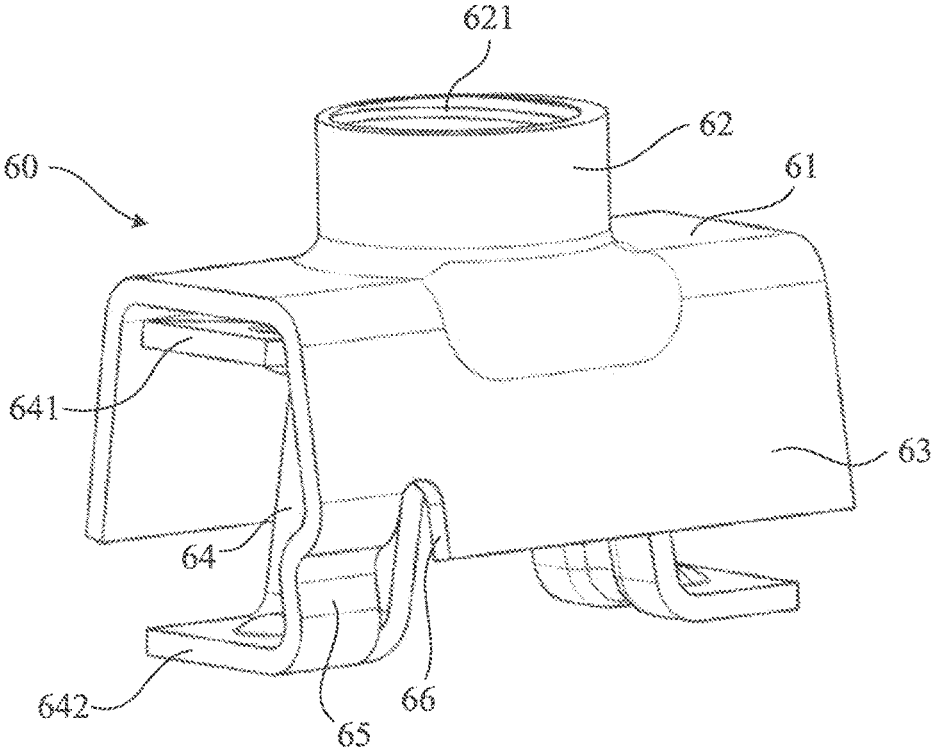
FIG. 4a is a perspective view of a photovoltaic panel fastener according to an aspect of the present disclosure.
Figure 4B:
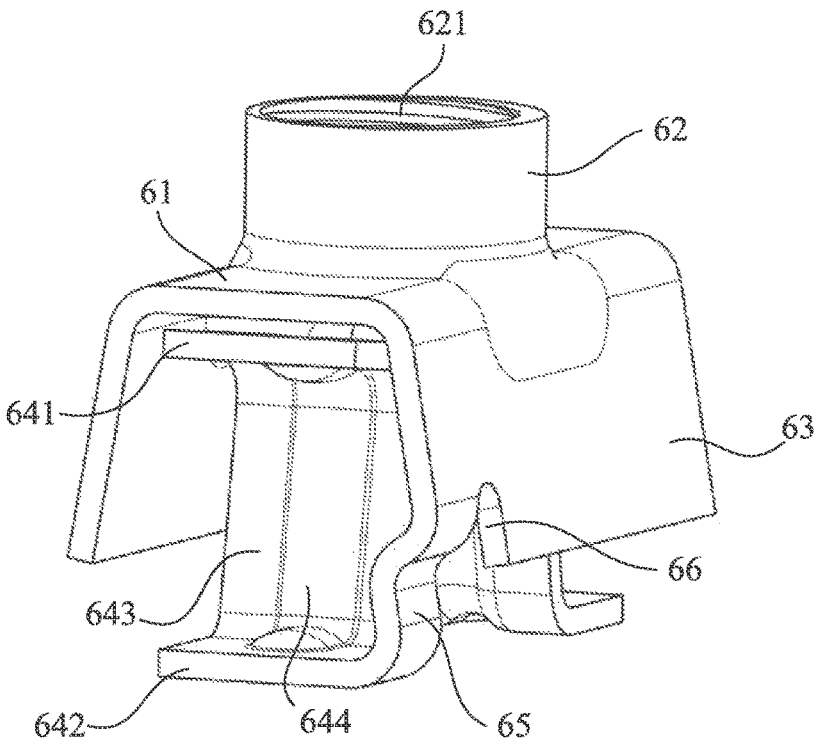
FIG. 4b is another perspective view of a photovoltaic panel fastener.
Figure 4C:
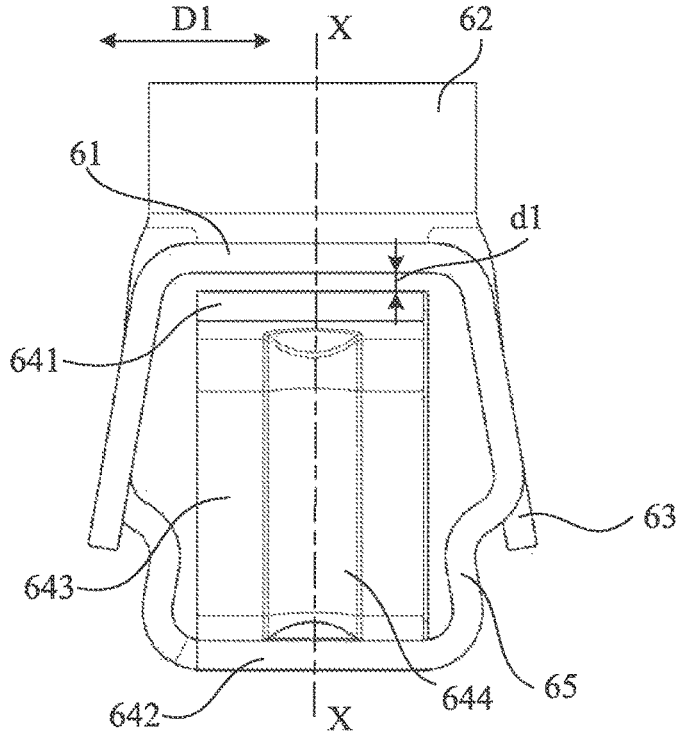
FIG. 4c is an orthographic view of the photovoltaic panel fastener on a support-element side.
Figure 4D:
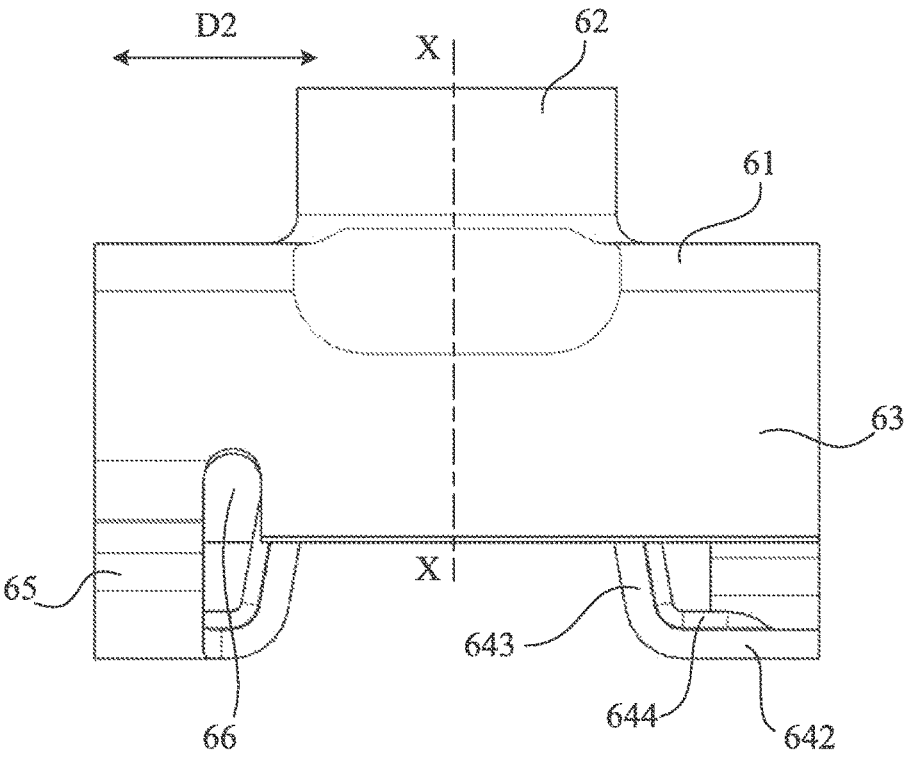
FIG. 4d is an orthographic view of the photovoltaic panel fastener on the clamping-element side.
Figure 4E:
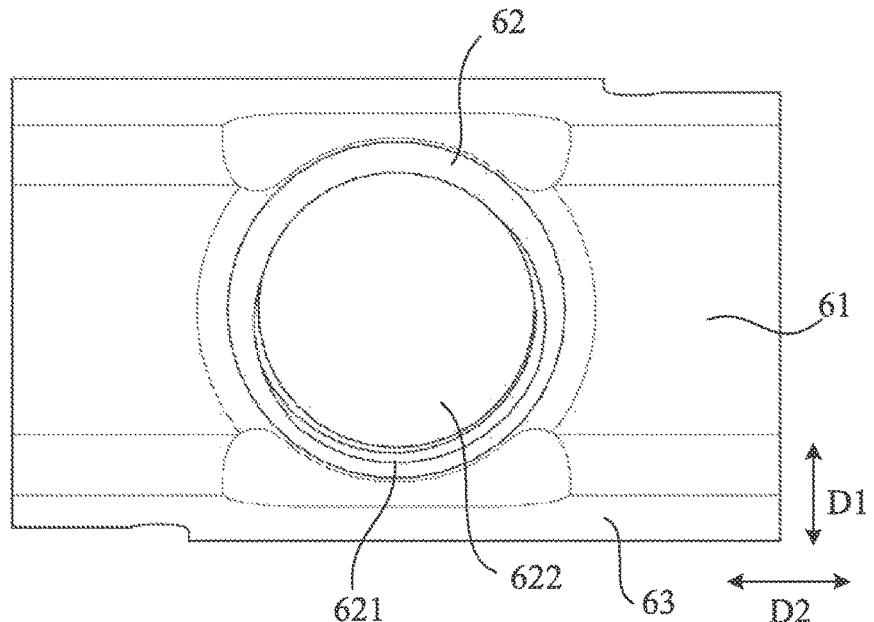
FIG. 4e is a top view of the photovoltaic panel fastener.
Figure 4F:
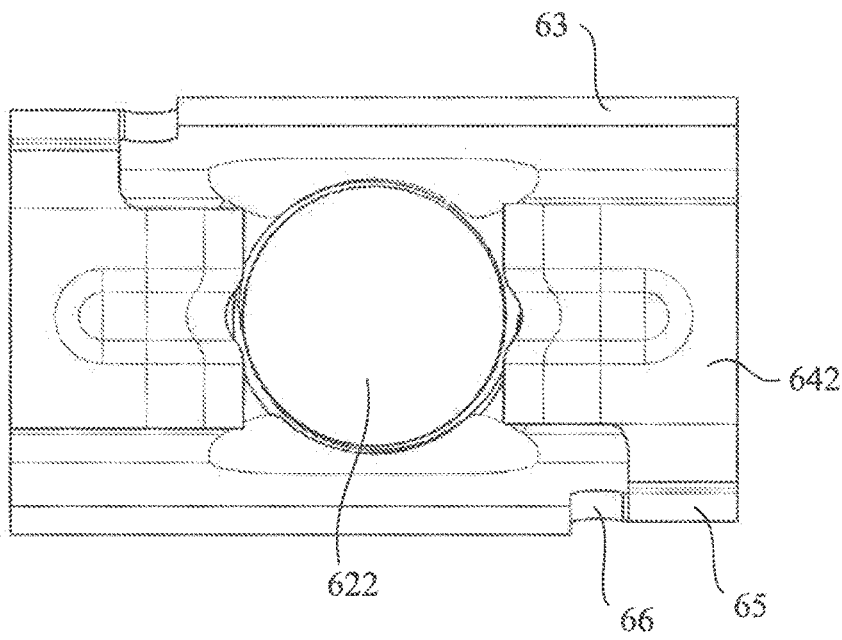
FIG. 4f is a bottom view of the photovoltaic panel fastener.

FIGS. 4a to 4f show a photovoltaic panel fastener 60 according to one embodiment. The photovoltaic panel fastener 60 mainly comprises a main body 61, a threaded connector 62, a pair of clamping elements 63 and a pair of support elements 64. The main body 61 is substantially parallel to the mounting surface 21 of the support structure 20, and the threaded connector 62 extends perpendicularly to the main body 61 and includes a passage 622 for receiving the bolt 30 (as illustrated in FIG. 4e). The inner wall of the passage 622 is provided with an inner thread 621 cooperating with the outer thread 32 of the bolt 30 (as illustrated in FIG. 5b). As shown in FIG. 4c, a pair of clamping elements 63 respectively extend from the end surface of the main body 61 and are disposed symmetrically with respect to the central axis XX of the threaded connector 62 according to a first direction D1 to carry out the clamping of the assembly frame 10. As shown in FIG. 4d, a pair of support elements 64 are disposed symmetrically with respect to the central axis XX of the threaded connector 62 along a second direction D2. The second direction D2 is perpendicular to the first direction D1, as illustrated in FIG. 4e. Each support element 64 is respectively connected to a clamping element 63 and extends beyond the free end of the clamping rib 63 to bear against the mounting surface 21 of the support structure 20. In this way, the clamping elements and the support elements can be arranged in a compact manner, so that the space occupied by the photovoltaic panel fasteners is reduced, which is particularly advantageous for the narrow space of the assembly frame. Moreover, the symmetrical arrangement of the clamping elements and of the support elements also makes the structural design simpler, and at the same time, the force is uniformly distributed for the support and the clamping. In the following description, just one of the clamping elements and one support element are described for more clarity.

In the embodiment illustrated, the threaded connector 62 is presented as an example in the form of a nut having a circular transverse cross-section. It must be understood that the outer peripheral shape of the threaded connector is not limited to that shown in the drawing, and can also have a square or other shape, as long as its inner thread is adapted to be compatible with the outer thread of the bolt.

In some aspects not shown, the threaded connector 62 and the pair of clamping elements 63 can be arranged on the same side of the main body 61, that is to say that both are located under the main body 61 in the orientation shown in the drawings so as to reduce the bulk of the photovoltaic panel fasteners. In this way, the pair of support elements 64 do not interfere with the outer circumference of the threaded connector. In the embodiment shown in the drawing, the threaded connector 62 and the pair of clamping elements 63 are respectively arranged on both sides of the main body 61. In this way, the space between the pair of support elements 64 is advantageously less than the outer diameter of the bolt 30. In this way, the fasteners of the photovoltaic panel can be sheathed onto the bolts 30 shown in FIGS. 3a and 3b, so that the ends of the bolts 30 are inserted between the support elements 64 and maintained, in order for the fastener of the photovoltaic panel 60 to be preinstalled on the support structure 20.

As shown in FIGS. 4a to 4f and 5b, in some aspects, the support element 64 is configured to be substantially in the shape of a U. It comprises a first support part 641 extending towards the main body 61, a second support part 642 to be stopped against the mounting surface 21 of the support structure 20 and a support link part 643 between the first support part 641 and the second support part 642. The second support part 642 and the clamping element 63 are connected by a bridge 65 in the shape of an arc. In this way, an enlarged contact zone between the support element 64 and the mounting surface 21 of the support structure 20 can be obtained via the second support part 642, and an effect of reliable support can be obtained. The manner in which the bridge in the shape of an arc 65 is used to link the support element 64 and the clamping element 63 also allows to obtain the desired fastening resistance, which will be more clearly understood with the detailed description below. Advantageously, as shown in FIG. 4c, the bridge in the shape of an arc 65 is folded towards the inside from the free end of the clamping element 63 to extend up to the second support part 642. In this way, the support element 64 does not interfere with the locking rib 63 when it is deformed under stress. Moreover, this also allows to configure the width of the support element 64 so as to be less than or equal to the width of the opening 111 of the assembly frame 10 without affecting the installation with the assembly frame 10.

In order to give the support element 64 an increased structural resistance, a reinforcing rib 644 extending from the first support part 641 to the second support part 642 is advantageously provided on the support element 64. Optionally, the reinforcing rib 644 can extend continuously from the first support part 641 through the support link part 643 and to the second support part 642 as shown in the drawing. Alternatively, the reinforcing rib can be shaped like a structure with multiple sections extending in a discontinuous manner, that is to say that independent reinforcing ribs are formed on the first support part 641, the support link part 643 and the second support part 642. This can also increase the resistance of the support elements.

In some aspects, notches are provided on the clamping element 63 to reduce the rigidity of the clamping element. In the embodiment shown in FIGS. 4a and 4b, the notch 66 can be formed at the free end of the clamping element 63 and adjacent to the bridge in the shape of an arc 65. This allows to reduce the insertion force required during the assembly of the assembly frame 10 and the photovoltaic panel fastener 60. Alternatively, more than one notch can be provided, and the notch can be provided in any suitable position on the clamping element. The notch can for example be formed by an opening in the median position at the clamping element.

Advantageously, the photovoltaic panel fastener according to the present disclosure can have a preassembly state and a fastening state. FIG. 4c shows that when the fastener of the photovoltaic panel is not fastened, that is to say in the preassembly state, the structure in the shape of a U of the support element 64 defines a first space d1 formed between the first support part 641 and the main body 61. Once the fastening force has been applied and in the fastening state, the first support part 641 bears against the main body 61 under the action of the fastening force, and the first space d1 is no longer visible. In other words, the main body 61 allows to provide a support; and from the point of view of the operator, the first space d1 can be viewed directly to know whether the fastening has been obtained, so that the fastening force can be applied in a controlled manner. The application of an excessive force can be avoided, thus avoiding damaging the parts. In some aspects, the fastening force mentioned above is applied by screwing of the bolt 30 into the threaded connector 62 along the passage 622 d. This is described in detail below.

That which follows describes the other embodiment of the photovoltaic panel fastener, which is applied to the device for mounting the photovoltaic panel module, in relation to FIGS. 5a to 7b.

In the embodiment illustrated, the device for mounting the photovoltaic panel module comprises the assembly frame 10, the support structure 20 and the photovoltaic panel fastener 60 as described above. Once the bolts 30 have been installed on the support structure 20 as shown in FIGS. 3a and 3b, and as shown in FIGS. 5a to 5c, the fasteners 60 of the photovoltaic panel can be engaged onto the bolts 30 via the top of the mounting surface 21 of the support structure 20. The bolt 30 is engaged with a part of the inner thread 621 of the threaded connector 62, and FIG. 5b shows that the bolt 30 is clamped by the support link part 643 of a pair of support elements. The photovoltaic panel fastener 60 is thus in the first state of preliminary positioning, or in the unstressed preassembly state. There is a first space d1 between the first support part 641 of the support element 64 and the main body 61, as shown by FIG. 5b. In parallel, the second support part 642 comes in contact with the mounting plane 21 of the support structure 20 without undergoing an outside force. Moreover, the operator can manually rotate the fastener of the photovoltaic panel to position it in the desired direction. Because of this structural design, the photovoltaic panel fastener 60 and the support structure 20 can be considered as preassembled components in some aspects, for example, preassembled on the support structure 20. A plurality of bolts 30 and of photovoltaic panel fasteners 60 can thus be applied to various types of assemblies. For example, the photovoltaic panel is generally a rectangular structure, and at least four photovoltaic panel fasteners 60 on the two support structures 20 are necessary to attach the photovoltaic panel. The preassembled components mentioned above can efficiently reduce the assembly time in the first steps of the assembly.

Figure 6A:
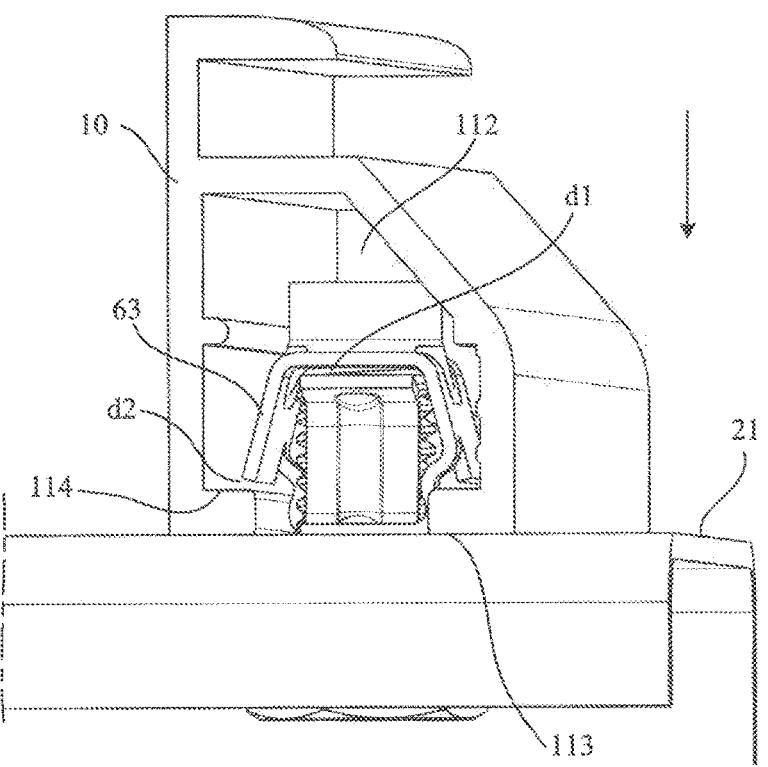
FIG. 6a is a perspective view of the assembly frame mounted on the support structure, the fastening elements of the photovoltaic panel being housed in its cavity in a second state.
Figure 6B:
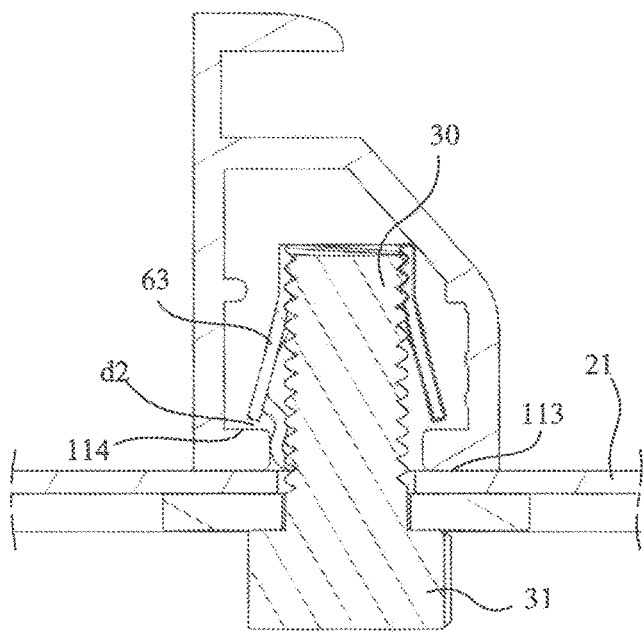

Then, as shown in FIGS. 6a and 6b, the assembly frame 10 with the opening downwards is mounted to the fastener of the photovoltaic panel, in the direction of the arrow of FIG. 6a. As described above, the clamping elements 63 are configured to clamp the assembly frame 10. For this reason, the pair of clamping elements 63 of the photovoltaic panel fastener can be configured to be stopped against the inner stop surface 114 in the cavity 112 when they are inserted into the cavity via the slot. This means that (i) when the assembly frame 10 is inserted downward, its bottom comes in contact and presses the surface of the pair of clamping elements 63, (ii) the pair of clamping elements 63 deform towards one another until the assembly frame 10 has completely passed through, (iii) the outer contact surface 113 of the bottom is in contact with the mounting plane 21 of the support structure, and (iv) the clamping element 63 is put back in place and is stopped against the inner stop surface 114. This is also why the notch is provided on the clamping element 63: to reduce the rigidity, thus facilitating the assembly of the frame insert. At this moment, the photovoltaic panel fastener is in the second preassembly state in the cavity of the assembly frame, but is still in an unstressed preassembly state, and there is a first space d1 between the first support part 641 and the main body 61. Moreover, FIGS. 6a and 6b show that a second space d2 is also formed between the clamping element 63 and the inner stop surface 114. Consequently, the assembly frame 10 can for example be moved horizontally along the mounting surface 21, in the orientation shown in FIG. 6b to adjust the position in order to ensure the accuracy of the positioning.

Figure 7A:
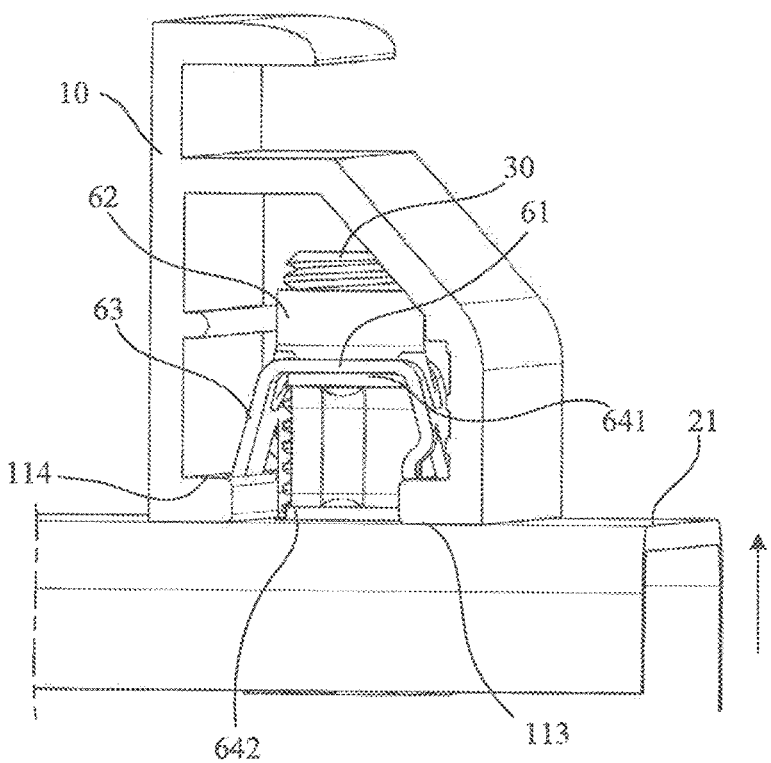
FIG. 7a is a perspective view of the photovoltaic panel fastener and of the threaded fastener in a third state for attaching the assembly frame and the support structure.
Figure 7B:
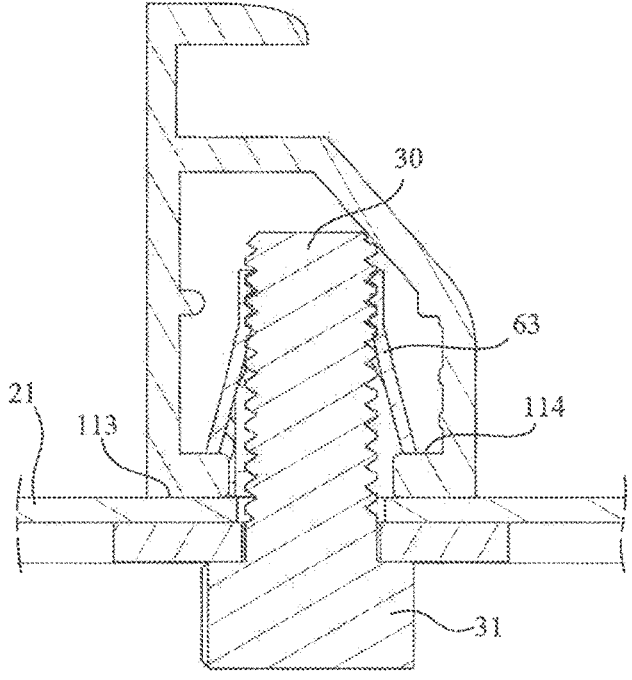

When it is put in place, as shown by FIGS. 7a and 7b, the operator can further rotate the bolt 30 upward in the direction of the arrow from below the support structure. In this way, the threaded connector 62 of the fastener of the photovoltaic panel moves downward under the action of the engagement until the clamping element 63 bears against the inner stop surface 114 of the assembly frame 10. The second space d2 is thus no longer visible, and a torque is applied during the rotation of the bolt to obtain the desired fastening force. The arrangement of the bridge in the shape of an arc is such that when a torque is applied to deform the support element, the bridge in the shape of an arc is also deformed accordingly, thus giving the support element a wider deformation interval. In other words, this constitutes a clamping force interval. Moreover, with respect to the rigid contact, the existence of a bridge in the shape of an arc also makes the bolt 30 less liable to become defective after having been clamped. At this moment, the photovoltaic panel fastener is in the third state of fastening of the assembly frame 10 and of the support structure 20, which is the fastening state from which the fastening effect is obtained. As visible in the drawing, the first space d1 is no longer visible, a support part 641 and the main body 61 bear against one another, which reinforces the overall resistance of the fastener of the photovoltaic panel, and makes the fastening more stable and reliable. Moreover, in the fastening state, the existence of the bridge in the shape of an arc also allows the assembly frame to have a certain elasticity according to the clamping axis, which further has an anti-vibration effect.

However, during disassembly, the bolt 30 can be rotated in the reverse direction under the support structure 20, so that the threaded connector 62 of the photovoltaic panel fastener 60 moves upward under the action of the threaded engagement and goes back to the state shown in FIG. 6a.

The invention claimed is:

1. Photovoltaic panel fastener, capable of cooperating with a threaded fastener to fasten an assembly frame of the photovoltaic panel to a support structure, characterised in that the photovoltaic panel fastener comprises:

a main body, said main body being substantially parallel to a mounting surface of the support structure;

a threaded connector, the threaded connector extending perpendicularly to the main body and having a passage provided with an inner thread to receive the threaded fastener;

a pair of clamping elements, the pair of clamping elements extending respectively from an end surface of the main body and being disposed along the first direction and symmetrical with respect to a central axis of the threaded connector, so as to be suitable for clamping the assembly frame; and a pair of support elements, the pair of support elements being disposed along the second direction and symmetrical with respect to the central axis of the threaded connector, hence each support element is respectively connected to a corresponding one of the clamping elements and extends beyond a free end of the corresponding one of the clamping elements to bear against the mounting surface of the support structure, and the second direction is perpendicular to the first direction.

2. Photovoltaic panel fastener according to claim 1, wherein the threaded connector and the pair of clamping elements are disposed on the same side of the main body, and the pair of support elements are spaced apart so that they do not interfere with an outer circumference of the threaded connector; or alternatively the threaded connector and the pair of clamping elements are respectively arranged on opposing sides of the main body, a spacing between the pair of support elements being less than an outer diameter of the threaded fastener.

3. Photovoltaic panel fastener according to claim 1, wherein each support element is arranged to be substantially in the shape of a U and comprises a first support part extending towards the main body, a second support part for bearing against the mounting surface of the support structure, and a support link part between the first support part and the second support part, hence the second support part is connected with the respective clamping element via a bridge in the shape of an arc.

4. Photovoltaic panel fastener according to claim 3, wherein the bridge in the shape of the arc is folded towards the inside from the free end of the respective clamping element to extend up to the second support part.

5. Photovoltaic panel fastener according to claim 3, wherein each support element is provided with a reinforcing rib extending from the first support part to the second support part.

6. Photovoltaic panel fastener according to claim 2, wherein each clamping element is provided with a notch to reduce the rigidity of each clamping element.

7. Photovoltaic panel fastener according to claim 1, wherein the photovoltaic panel fastener can have a first state, called preassembly state, and a second state, called fastening state:

in the first state, each support element and the main body are separated by a first space;

in the second state, each support element bears against the part of the main body under the action of a clamping force.

8. Photovoltaic panel fastener according to claim 7, wherein a fastening force is applied by screwing the threaded fastener into the threaded connector.

9. Device for mounting a photovoltaic panel module, comprising an assembly frame for the installation of photovoltaic panels, a support structure and at least one photovoltaic panel fastener according to claim 1, characterised in that:

the assembly frame comprises a frame body and a photovoltaic panel clamping slot provided on an upper part of the frame body, and the frame body comprises a cavity provided with an opening for receiving the at least one photovoltaic panel fastener;

said pair of clamping elements of the at least one photovoltaic panel fastener are configured to be stopped against an inner stop surface when they are inserted into the cavity via the photovoltaic panel clamping slot, wherein each clamping element and the inner stop surface are separated by a second space in a preassembly state, and the clamping elements bear against the inner stop surface under the action of a clamping force in a fastening state.

10. Mounting device according to claim 9, wherein the support structure is provided with a mounting hole that corresponds to the photovoltaic panel clamping slot, so that the threaded fastener can be coupled with the threaded connector while passing through the mounting hole and the photovoltaic panel clamping slot, hence a fastening force is applied by screwing of the threaded fastener by the support structure into the threaded connector of the at least one photovoltaic panel fastener.

11. Mounting device according to claim 9, wherein each support element of the at least one photovoltaic panel fastener has a width that is less than or equal to that of the photovoltaic panel clamping slot.

* * * * *